(12) United States Patent
Nair et al.

(10) Patent No.: US 9,858,396 B2
(45) Date of Patent: Jan. 2, 2018

(54) METHOD AND SYSTEM FOR UNIFIED MOBILE CONTENT PROTECTION

(71) Applicant: Azuki Systems, Inc., Acton, MA (US)

(72) Inventors: Raj Nair, Lexington, MA (US); Mikhail Mikhailov, Newton, MA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 14/563,642

(22) Filed: Dec. 8, 2014

(65) Prior Publication Data

US 2015/0095646 A1   Apr. 2, 2015

Related U.S. Application Data

(63) Continuation of application No. 13/370,537, filed on Feb. 10, 2012, now abandoned, which is a
(Continued)

(51) Int. Cl.
*H04L 29/06* (2006.01)
*G06F 21/10* (2013.01)
(Continued)

(52) U.S. Cl.
CPC ............ *G06F 21/10* (2013.01); *G06Q 50/184* (2013.01); *H04L 9/28* (2013.01); *H04L 63/0428* (2013.01);
(Continued)

(58) Field of Classification Search
CPC ............ G06F 21/10; G06F 2221/2107; H04N 21/8456; H04N 21/2347; H04N 21/2351; H04N 21/63345; H04N 21/4405; H04N 21/26613; H04N 21/41407; H04N 21/6125; H04N 21/25816; H04N 21/4353; H04N 21/4627; H04N 21/6582; H04N 21/42684; H04N 7/1675; H04N 7/17318;
(Continued)

(56) References Cited

U.S. PATENT DOCUMENTS 6,415,032 B1   7/2002 Doland
6,550,011 B1   4/2003 Sims, III
(Continued)

FOREIGN PATENT DOCUMENTS

WO   2010150226 A2   12/2010

OTHER PUBLICATIONS

De Canniere, Christopher. "eSTREAM Software Performance", 2008.
(Continued)

*Primary Examiner* — Michael Simitoski

(57) ABSTRACT

Media content is delivered to a variety of mobile devices in a protected manner based on client-server architecture with a symmetric (private-key) encryption scheme. A media preparation server (MPS) encrypts media content and publishes and stores it on a content delivery server (CDS), such as a server in a content distribution network (CDN). Client devices can freely obtain the media content from the CDS and can also freely distribute the media content further. They cannot, however, play the content without first obtaining a decryption key and license. Access to decryption keys is via a centralized rights manager, providing a desired level of DRM control.

20 Claims, 7 Drawing Sheets

Related U.S. Application Data continuation of application No. PCT/US2010/045596, filed on Aug. 6, 2010.

(60) Provisional application No. 61/234,092, filed on Aug. 14, 2009.

(51) Int. Cl.

| | | |
|---|---|---|
| *H04N 7/167* | (2011.01) | |
| *H04N 7/173* | (2011.01) | |
| *H04L 9/28* | (2006.01) | |
| *G06Q 50/18* | (2012.01) | |
| *H04L 29/08* | (2006.01) | |
| *H04N 21/2347* | (2011.01) | |
| *H04N 21/235* | (2011.01) | |
| *H04N 21/258* | (2011.01) | |
| *H04N 21/266* | (2011.01) | |
| *H04N 21/414* | (2011.01) | |
| *H04N 21/426* | (2011.01) | |
| *H04N 21/435* | (2011.01) | |
| *H04N 21/4405* | (2011.01) | |
| *H04N 21/4627* | (2011.01) | |
| *H04N 21/61* | (2011.01) | |
| *H04N 21/6334* | (2011.01) | |
| *H04N 21/658* | (2011.01) | |
| *H04N 21/845* | (2011.01) | |
| *G06F 21/30* | (2013.01) | |
| *G06F 17/30* | (2006.01) | |
| *H04N 21/835* | (2011.01) | |

(52) U.S. Cl.
CPC ............ *H04L 67/10* (2013.01); *H04N 7/1675* (2013.01); *H04N 7/17318* (2013.01); *H04N 21/2347* (2013.01); *H04N 21/2351* (2013.01); *H04N 21/25816* (2013.01); *H04N 21/26613* (2013.01); *H04N 21/41407* (2013.01); *H04N 21/42684* (2013.01); *H04N 21/4353* (2013.01); *H04N 21/4405* (2013.01); *H04N 21/4627* (2013.01); *H04N 21/6125* (2013.01); *H04N 21/63345* (2013.01); *H04N 21/6582* (2013.01); *H04N 21/8456* (2013.01); *G06F 2221/2107* (2013.01); *H04L 65/4084* (2013.01); *H04L 2463/101* (2013.01); *H04N 21/835* (2013.01)

(58) Field of Classification Search
CPC .... H04N 21/835; G06Q 50/184; H04L 67/10; H04L 9/28; H04L 63/0428; H04L 65/4084; H04L 2463/101
See application file for complete search history.

(56) References Cited

U.S. PATENT DOCUMENTS

| | | | |
|---|---|---|---|
| 6,574,609 B1 | 6/2003 | Downs et al. | |
| 6,957,350 B1 | 10/2005 | Demos | |
| 6,963,972 B1 | 11/2005 | Chang et al. | |
| 7,093,129 B1 | 8/2006 | Gavagni et al. | |
| 7,191,332 B1* | 3/2007 | Pankajakshan | H04L 63/0428 713/160 |
| 7,219,223 B1 | 5/2007 | Bacchus et al. | |
| 7,301,944 B1 | 11/2007 | Redmond | |
| 7,602,908 B2 | 10/2009 | Pare et al. | |
| 7,676,835 B2* | 3/2010 | Brannon | G06F 21/6218 726/10 |
| 7,711,647 B2* | 5/2010 | Gunaseelan | G06F 21/10 705/50 |
| 7,734,908 B1 | 6/2010 | Kung et al. | |
| 7,827,408 B1 | 11/2010 | Gehringer et al. | |
| 7,840,667 B2* | 11/2010 | Weller | G06Q 40/04 370/254 |
| 8,127,149 B1 | 2/2012 | Nachenberg | |
| 8,291,504 B2* | 10/2012 | Padinjareveetil | H04L 63/08 709/203 |
| 8,458,362 B2* | 6/2013 | Holden | H04N 21/23439 709/217 |
| 8,578,259 B2* | 11/2013 | Chen | G11B 27/034 348/557 |
| 9,225,541 B2* | 12/2015 | Thomas | H04L 12/2812 |
| 9,270,748 B2* | 2/2016 | Karlsson | H04L 65/602 |
| 2001/0029525 A1* | 10/2001 | Lahr | G06F 17/30864 709/218 |
| 2002/0007456 A1* | 1/2002 | Peinado | G06F 21/10 713/164 |
| 2002/0037079 A1 | 3/2002 | Duval | |
| 2002/0069420 A1* | 6/2002 | Russell | G06F 21/10 725/92 |
| 2002/0146122 A1 | 10/2002 | Vestergaard et al. | |
| 2003/0033606 A1* | 2/2003 | Puente | H04N 7/17336 725/110 |
| 2003/0093694 A1 | 5/2003 | Medvinsky et al. | |
| 2003/0105718 A1 | 6/2003 | Hurtado et al. | |
| 2003/0131353 A1 | 7/2003 | Blom et al. | |
| 2003/0140257 A1 | 7/2003 | Peterka et al. | |
| 2003/0161473 A1* | 8/2003 | Fransdonk | G06F 21/10 380/277 |
| 2003/0188154 A1 | 10/2003 | Dallard et al. | |
| 2003/0204602 A1* | 10/2003 | Hudson | D01D 5/423 709/228 |
| 2003/0204738 A1 | 10/2003 | Morgan | |
| 2004/0001594 A1* | 1/2004 | Krishnaswamy | H04L 63/0428 380/277 |
| 2004/0088541 A1 | 5/2004 | Messerges et al. | |
| 2004/0103319 A1 | 5/2004 | Kato et al. | |
| 2004/0148344 A1* | 7/2004 | Navar | H04L 29/06 709/203 |
| 2004/0177369 A1 | 9/2004 | Akins | |
| 2004/0193550 A1 | 9/2004 | Siegel | |
| 2004/0247116 A1* | 12/2004 | Boren | H04L 9/0662 380/37 |
| 2005/0021467 A1 | 1/2005 | Franzdonk | |
| 2005/0071631 A1 | 3/2005 | Langer | |
| 2005/0086501 A1* | 4/2005 | Woo | G06F 21/10 713/189 |
| 2005/0094809 A1* | 5/2005 | Pedlow | H04N 7/17336 380/200 |
| 2005/0097361 A1* | 5/2005 | Apostolopoulos | G06F 21/64 726/4 |
| 2005/0097596 A1 | 5/2005 | Pedlow, Jr. | |
| 2005/0097597 A1 | 5/2005 | Pedlow et al. | |
| 2005/0190911 A1 | 9/2005 | Pare et al. | |
| 2005/0240764 A1 | 10/2005 | Koshy et al. | |
| 2005/0244008 A1 | 11/2005 | England et al. | |
| 2005/0278259 A1* | 12/2005 | Gunaseelan | G06F 21/10 705/59 |
| 2006/0031222 A1* | 2/2006 | Hannsmann | G06F 21/10 |
| 2006/0056324 A1* | 3/2006 | Hyyppa | G06Q 20/123 370/310 |
| 2006/0080546 A1* | 4/2006 | Brannon | G06F 21/6218 713/185 |
| 2006/0095382 A1* | 5/2006 | Mahlbacher | G06F 21/10 705/59 |
| 2006/0190719 A1 | 8/2006 | Rao et al. | |
| 2006/0212649 A1 | 9/2006 | Roberts | |
| 2006/0236221 A1 | 10/2006 | McCausland et al. | |
| 2006/0265758 A1* | 11/2006 | Khandelwal | G06F 21/10 726/27 |
| 2006/0272028 A1 | 11/2006 | Maes | |
| 2006/0282391 A1 | 12/2006 | Peterka et al. | |
| 2007/0124245 A1* | 5/2007 | Sato | G06F 21/10 705/50 |
| 2007/0124781 A1* | 5/2007 | Casey | H04N 7/17318 725/94 |
| 2007/0172069 A1* | 7/2007 | Kim | G06F 21/10 380/278 |
| 2007/0180496 A1 | 8/2007 | Fransdonk | |
| 2007/0208668 A1* | 9/2007 | Candelore | G06Q 20/3829 705/57 |

(56) References Cited

U.S. PATENT DOCUMENTS

| | | | |
|---|---|---|---|
| 2007/0226365 A1* | 9/2007 | Hildreth | G11B 27/034 709/231 |
| 2007/0265978 A1* | 11/2007 | Kahn | G06Q 30/04 705/59 |
| 2008/0016368 A1 | 1/2008 | Adams | |
| 2008/0046758 A1 | 2/2008 | Cha et al. | |
| 2008/0047006 A1 | 2/2008 | Jeong et al. | |
| 2008/0071617 A1* | 3/2008 | Ware | G06Q 30/00 705/14.26 |
| 2008/0091613 A1 | 4/2008 | Gates et al. | |
| 2008/0123859 A1 | 5/2008 | Mamidwar | |
| 2008/0154780 A1* | 6/2008 | Soukup | G06F 21/10 705/54 |
| 2008/0195743 A1* | 8/2008 | Brueck | H04L 29/06027 709/231 |
| 2008/0207182 A1 | 8/2008 | Maharajh | |
| 2009/0029644 A1* | 1/2009 | Sue | H04H 20/24 455/3.02 |
| 2009/0041236 A1* | 2/2009 | Gligoroski | H04L 9/065 380/43 |
| 2009/0055547 A1* | 2/2009 | Hudson | D01D 5/423 709/231 |
| 2009/0084862 A1 | 4/2009 | McCallum | |
| 2009/0103726 A1* | 4/2009 | Ahmed | H04L 9/0668 380/46 |
| 2009/0138699 A1 | 5/2009 | Miyazaki et al. | |
| 2009/0180614 A1 | 7/2009 | Rajagopal et al. | |
| 2009/0183211 A1 | 7/2009 | Yan et al. | |
| 2009/0191961 A1* | 7/2009 | McCoull | G06F 21/123 463/29 |
| 2009/0192942 A1* | 7/2009 | Cottrille | H04L 9/30 705/59 |
| 2009/0228450 A1* | 9/2009 | Zhang | G06F 21/10 |
| 2009/0315670 A1 | 12/2009 | Naressi et al. | |
| 2010/0049973 A1 | 2/2010 | Chen | |
| 2010/0057576 A1 | 3/2010 | Brodersen | |
| 2010/0070876 A1 | 3/2010 | Jain et al. | |
| 2010/0091985 A1 | 4/2010 | Pare et al. | |
| 2010/0211776 A1* | 8/2010 | Gunaseelan | G06F 21/10 713/165 |
| 2010/0235468 A1 | 9/2010 | Cobb et al. | |
| 2010/0269146 A1* | 10/2010 | Britt | H04N 7/1675 725/110 |
| 2010/0278338 A1 | 11/2010 | Chang et al. | |
| 2010/0281270 A1 | 11/2010 | Miyazaki et al. | |
| 2010/0306548 A1 | 12/2010 | Kravitz | |
| 2011/0087794 A1 | 4/2011 | Li et al. | |
| 2011/0107364 A1 | 5/2011 | Lajoie et al. | |
| 2011/0107379 A1* | 5/2011 | Lajoie | H04L 65/4076 725/87 |
| 2011/0145560 A1 | 6/2011 | Moon et al. | |
| 2011/0225417 A1* | 9/2011 | Maharajh | G06F 21/10 713/150 |
| 2011/0246616 A1 | 10/2011 | Ronca et al. | |
| 2011/0252115 A1 | 10/2011 | Karlsson et al. | |
| 2012/0128150 A1 | 5/2012 | Belenky et al. | |
| 2012/0246279 A1* | 9/2012 | Zang | H04L 65/4076 709/219 |
| 2013/0132733 A1* | 5/2013 | Agrawal | G06F 21/10 713/189 |

OTHER PUBLICATIONS

Frankel, S. et al. "The AES-CBC Cipher Algorithm and its Use with IPsec", Sep. 2003.
Pantos, R. ed. "HTTP Live Streaming" (draft-pantos-http-livestreaming-01), Jun. 2009.
Pare, David and Art Howard. "Ultravox 3.0, A Media Agnostic Lightweight Streaming Protocol", Dec. 2004.
Wu, Honjun. "The Stream Cipher HC-128", 2008.
Zhang, Jian. "A Flexible Content Protection System for Media-on-Demand", 2002.
Open Mobile Alliance (OMA). "DRM Specification V2.0, Draft Version 2.0", Apr. 2004.

* cited by examiner

METHOD AND SYSTEM FOR UNIFIED MOBILE CONTENT PROTECTION

BACKGROUND

The growing number of large form factor mobile devices such as the iPad has revolutionized mobile media consumption leading to revolutionary initiatives such as "TV Everywhere™" (TVE) with a mandate to make premium content available on a wide range of devices with great diversity in capabilities. This type of distribution, sometimes known as "Over-The-Top"(OTT) distribution, has underscored the need for a new and more robust trust model that builds on a 2-part trust model of user authentication and device identification and can offer the same level of content protection that content owners have had in the closed Consumer Electronics ecosystems of the past. The added level of protection can enable publishers to fully realize the potential for content distribution through this new open ecosystem of devices.

Content protection is challenging in mobile devices for a number of reasons. Mobile devices do not uniformly support Digital Rights Management (DRM) standards. In particular, most mobile devices do not currently support the most comprehensive form of content protection, the Open Mobile Alliance (OMA) V2.0 DRM standard. Mobile devices also vary in their CPU performance and memory capacity. An additional complication is the need to support multiple modes of delivery required in the mobile environment, such as live streaming, watching short video segments, rentals, or media download for watching later.

Current media protection schemes depend on sending the license information in-band with the media or using a pre-distributed license key in the media viewing device. Examples are Playready, WMDRM, Widevine, and Flash Access. However, TVE requires that the rights are transferable across devices in a seamless manner.

SUMMARY

The present invention relates in general to protecting media on mobile devices and more specifically to implementing a content protection system for media that may be streamed or watched offline on mobile devices. This system is particularly useful in the deployment of TVE services for protecting media on any Internet-connected device in an "Over-The-Top" (OTT) manner where the digital rights to the media are delivered to the device over the network and made specific to the device and user.

Methods and apparatus are disclosed for protecting content delivered to a variety of mobile devices based on client-server architecture with a symmetric (private-key) encryption scheme. In one embodiment, a media preparation server (MPS) encrypts all media content and publishes and stores it on a content delivery server (CDS), such as a server in a content distribution network (CDN). Clients can freely obtain media content from the CDS and can also freely distribute it further. They cannot, however, play the content without first obtaining a decryption key. Access to decryption keys is via a centralized rights manager, providing a desired level of DRM control.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
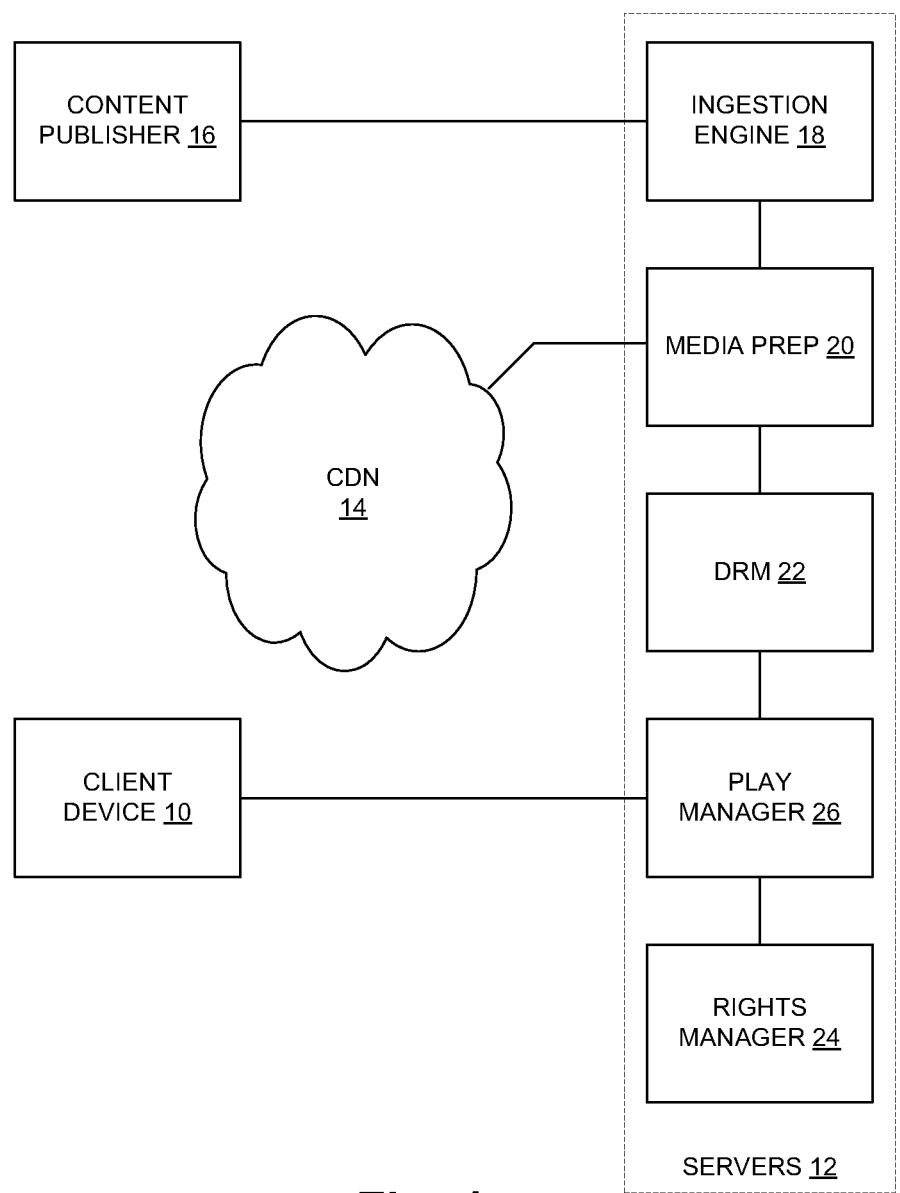
FIGS. 1 and 2 are block diagrams of systems capable of conducting procedures, in accordance with various embodiments of the invention.

FIG. 1 is a block diagram for one embodiment of the present invention. It shows a client device 10 and a plurality of servers 12 that are connected together in a secure network and together form an instance of what is referred to herein as a "wireless platform" (WP). The client device 10 and WP servers 12 are typically computerized devices which include one or more processors, memory, storage (e.g., magnetic or flash memory storage), and input/output circuitry all coupled together by one or more data buses, along with program instructions which are executed by the processor out of the memory to perform certain functions which are described herein. Part or all of the functions may be depicted by corresponding blocks in the drawings, and these should be understood to cover a computerized device programmed to perform the identified function.

In one embodiment, the servers 12 (referred to as servers herein) may be collocated in a single data center. In another embodiment, the servers 12 may be geographically distributed in multiple data centers. In another embodiment, the servers 12 may be physically in the same region, but connected to the client 10 through separate network paths (e.g. through different network service providers). In one embodiment, the servers 12 are situated as part of a content delivery network (CDN) 14. In one embodiment, the content from a content publisher 16 is ingested via an ingestion engine 18, and the ingested content is then segmented by a media preparation engine (MEDIA PREP) 20. The media preparation engine 20 obtains a content encryption/decryption key from a digital rights management (DRM) server 22 and uses it to encrypt the content for storage and later delivery in encrypted form. An example of streaming of content is shown in published PCT application WO 2010/045109.

In part of the description below, the combination of the ingestion engine 18, media prep 20 and a play manager 26 are referred to as a "content controller". Thus in one embodiment the system is constituted by a content controller along with a DRM server 22 and a rights manager 24.

A media preparation profile in the media preparation server 20 specifies an encryption type on a per-media-item basis. Candidate ciphers may include XOR, RC4, HC-128, AES, and along with the specification of encryption type is stored a corresponding key and a key length. Each user-selected media item has its own randomly generated key value. In the case of AES and XOR encryption, this randomly generated key value is used as the actual key for encryption/decryption, whereas for RC4 and HC-128 it is the seed key to initialize a stream cipher. AES key length is typically 128 bits. XOR key length may be 1024 bytes, and may be configurable. RC4 and HC-128 use 128 bit seed keys. The media preparation profile also specifies, on a per-media basis, the length of the byte stream which should be generated (this is the actual key used for media encryption, and the length is the same as the block length described elsewhere herein). Each user-selected media item is transcoded in multiple formats for different target platforms, and each of the resulting transcoded media files is immediately encrypted with the chosen cipher and key and the encrypted files are then pushed to the CDN 14. Additional details regarding encryption are provided below.

In order to use the system for downloading content, the client device 10 first authenticates with the rights manager 24 and registers its device with the DRM server 20. During this process the client 10 obtains a logical device id from the rights manager 24 that is a token to represent a user of the client device 10, and associates this token with the specific client device 10 via a device "fingerprint" which is a unique identifier for the client device 10. The unique identification may be based on certain physical properties that may include an international mobile equipment identifier (IMEI) number, media access control (MAC) address, or certain file system properties. Each of the supported client devices 10 provides an Application Programming Interface (API) via which the unique identifier of that device can be obtained. Some devices have an IMEI number, some a mobile equipment identifier (MEID) number, some an electronic serial number (ESN). The iPhone has a unique device identifier (UDID).

The client device 10 has a built-in domain key that is used to encrypt the exchange of the logical device ID with the rights manager 24. For enhanced security, the domain key is divided into a number of separate components which are stored so as to be difficult to locate. For example, each may be stored as an array, with elements of the array represented as strings containing an integer and some special characters which are commonly found in binary files. When the arrays are examined, it is difficult to detect where the components are located. At run-time, all arrays are processed, special characters are discarded, and elements of these arrays are converted into characters and concatenated together to produce the actual domain key.

Device registration is carried out as follows. A DRM Agent running on the client 10 generates an encrypted token containing a device id and a randomly generated long nonce. That information (device id and the random long nonce) is encrypted with the domain key and is sent to the DRM server 22. The DRM server 22 decrypts this registration message using the same domain key, and stores an association between this user, device id, and key nonce in a database. The DRM server 22 generates a response containing a unique logical id assigned to this user. This response is encrypted with a session key constructed from domain key, device id, and the random key nonce provided by the DRM Agent, and the encrypted response is sent to the client 10. Details regarding the construction of the session key are provided below.

Once the client 10 receives the response, it decrypts the response and stores registration information into an encrypted rights file on the client device 10. The rights file is encrypted with the key constructed from the combination of the domain key and the device id.

The session key may be constructed as follows:

A shared or domain key is combined with the device id and the randomly generated key nonce: shared_key+device_id+key_nonce. The resulting string is fairly long, so a hash or checksum is computed on it. In one embodiment, a hex representation of the hash, which may be 32 bytes long, is chosen to be the key. In different embodiments, the raw hash output (which may be a 128-bit integer) may be used. In one embodiment a Message Digest 5 (MD5) hash may be used. Other embodiments might use a 64-bit RACE Integrity Primitives Evaluation Message Digest (RIPEMD) hash function instead of MD5.

In other embodiments, it is possible to include other individualization parameters into these keys. Thus, the client/server session key, as well as the key used to encrypt the rights file on the device, could be enhanced further by adding unique user information (user token) and/or application information, such as the application name or identifier. That way, keys will be application-specific and user-specific as well as device-specific.

Figure 2:
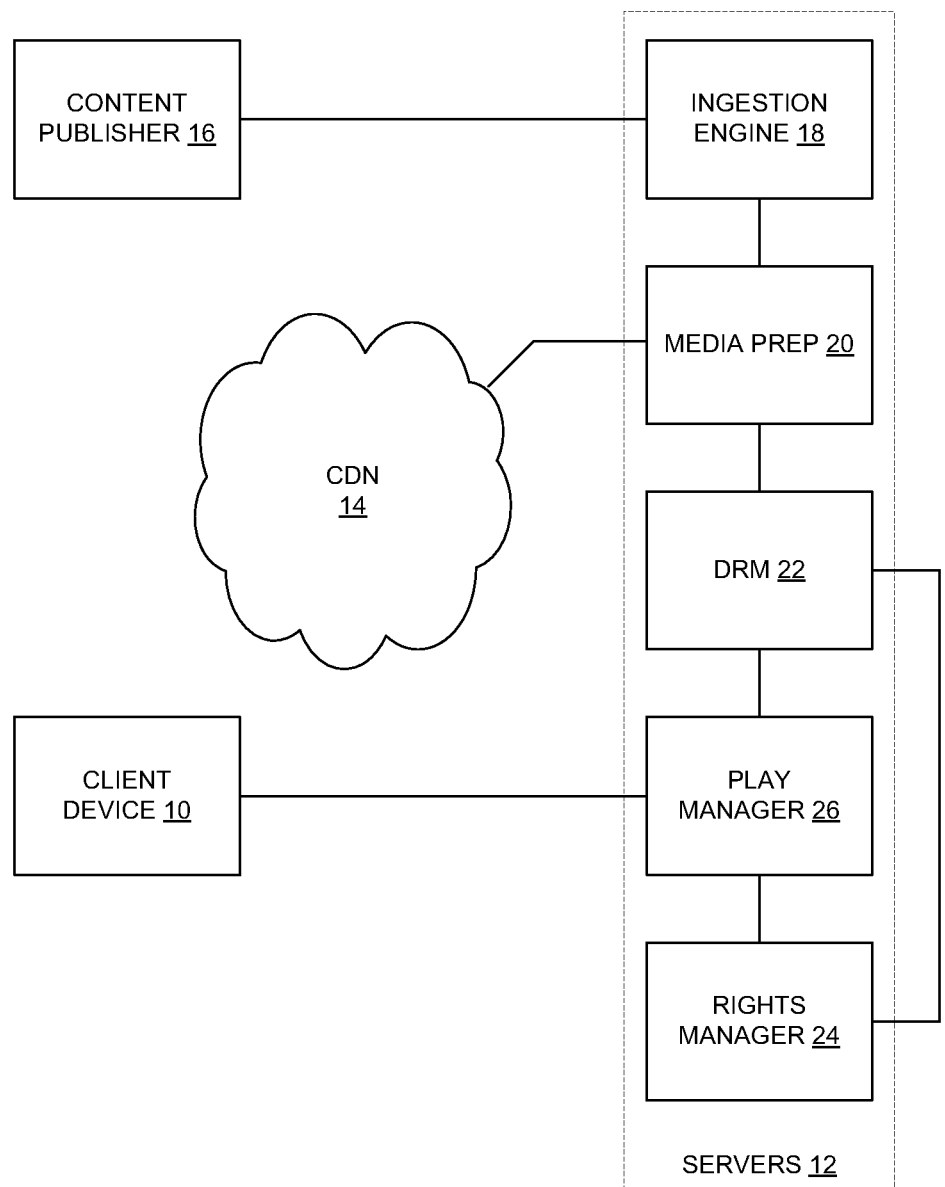

FIG. 2 shows a slightly different embodiment of the system, in which there is a connection directly between the rights manager 24 and the DRM server 22 to enable the DRM server 22 to directly consult with the rights manager 24 as may be required.

As previously mentioned, any of various content encryption schemes may be employed. The following presents several specific examples along with corresponding details regarding how encryption/decryption is carried out. In some embodiments, the encryption can be applied to portions of the file such as key frames for video in order to reduce processing load.

XOR

Figure 3:
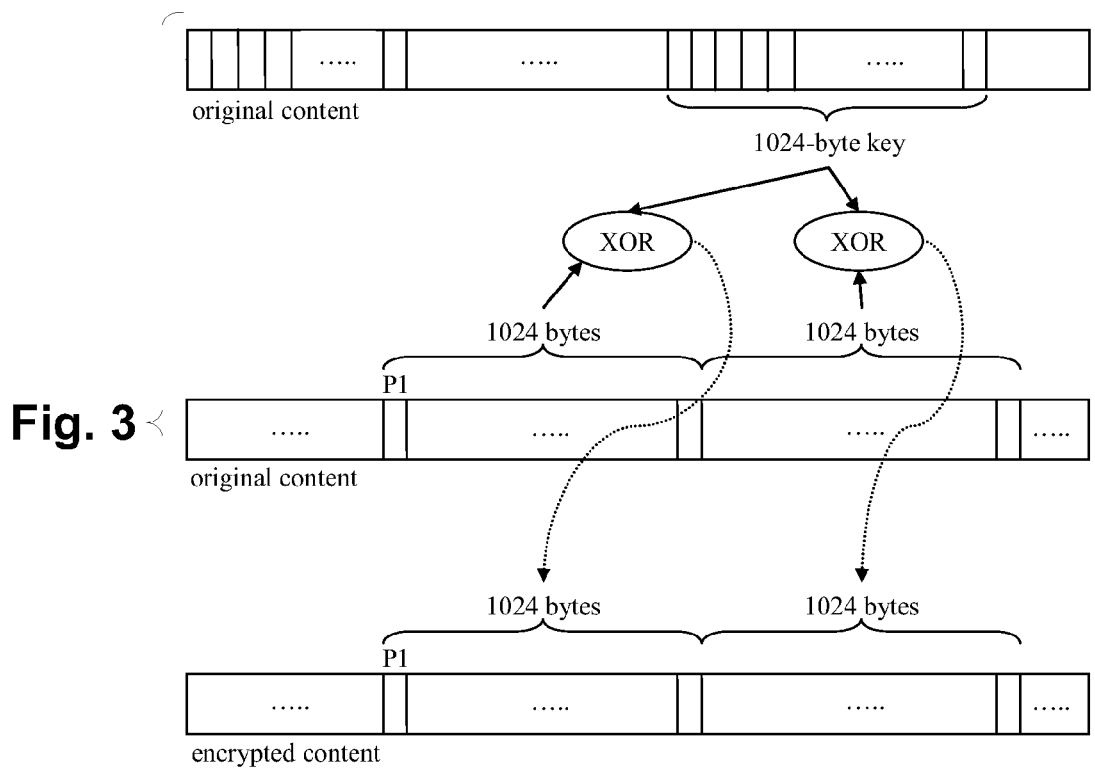
FIG. 3 is a diagram of the content encryption, in accordance with an embodiment of the present invention.

In one embodiment the following simple and fast symmetric (private key) encryption scheme is used. Operation is illustrated in FIG. 3. The media preparation server 20 performs an exclusive-OR operation (XOR) between the contents of the media file and a secret (private) key K1 (not shown). In one embodiment the key K1 is 1024 bytes long. The XOR operation starts at a random position P1 within the media file and continues until the end of the file. The random position P1 is preferably chosen to be close to the beginning of the file, e.g. within the first 10% of the file. P1 can also be a predetermined fixed position, for example the very beginning of the file (location 0).

The key K1 may be chosen in a variety of ways. For example, it may be generated randomly. Alternatively, it may be generated by first choosing another random position P2 (not shown) within the same file, and selecting 1024 bytes from the media file starting at position P2. If there are not 1024 bytes remaining between P2 and the end of the file, then 1024 bytes are selected starting at position P2−1024+1. As noted, the key length may be other than 1024 bytes, and may be configurable.

The media preparation server 20 stores P1 and P2 in a database for each media file. In addition, the media preparation server 20 associates an expiration time with the encryption keys, stores the expiration time in the database, and re-encrypts content with new keys upon key expiration.

RC4-Drop(n)

RC4-drop(n) is a stream-cipher algorithm generally known to those skilled in the art. It includes the dropping of the first 3072 bytes from each generated keystream. Also, RC4 does not have a formal notion of an initialization vector (IV). Instead, a checksum is computed on a concatenated key and an arbitrarily chosen initialization value, and the checksum is used as the key.

In one embodiment of stream cipher encoding, the entire media file is divided into smaller blocks of a selected block size. With a stream cipher, one can generate an infinitely-long stream of bytes. Theoretically, if a content item (e.g., movie) were to be played only from start to finish, without rewinding or fast-forwarding (i.e. without scrubbing), a stream cipher could be used on the streaming media without specialization. However, since the user may scrub during playback, decryption requires a modification to the stream cipher. The media is divided into fixed-size blocks and a new stream of key bytes is generated for each block by using the same seed key and a different IV. The IV in this case can be just the sequential block number, starting from 0. In one embodiment the blocks can have length 32 k, but the block length can be different in other embodiments and may be configurable.

HC-128

HC-128 is another well-known stream cipher whose block size can be adapted as described above. Also, in addition to block size, both RC4 and HC-128 can take into account a segment number for live streaming and for video on demand (VOD). The entire long-form content is represented as many segments, and each segment is then divided into multiple blocks from the encryption/decryption point of view.

AES

The same approach to block sizing may be taken for AES unless of course in some embodiments the decryption is done in hardware. It may be desirable to use the same form of AES encryption supported by iPhone® and iPad®, which is AES bit with Cipher-Block-Chaining (CBC mode). Each segment is encrypted individually, and the same key is used across all segments, but each segment has its own initialization vector which is the sequence number of the segment.

It is briefly described how a user obtains a rights object (RO) to use in downloading and streaming, as well as playing, content. The user registers with a content provider using, in one embodiment, OpenID technology and obtains a user token which uniquely identifies that user. Before the user can play a given media content file, the user must obtain the decryption key. A DRM agent running on the client device 10 contacts the rights manager 24 and provides three items: <device-id, media-id, user-token>, where device-id is a unique identifier specific to that particular mobile device, media-id is a unique identifier specific to the particular media content the user wants to play, and user-token is the unique user identifier. Device id could be the unique address of the mobile device, or it may be one of the types of device identifiers discussed above.

The rights manager 24 receives the request for the RO from the client 10, containing <device-id, media-id, user-token>. The rights manager 24 validates the user-token using OpenID technology and also validates that media-id is correct and has not expired. It then generates the requested RO, which contains a key value K1 for media content decryption, a remaining play count for that media, and a media license expiration time. Even though communications between the client 10 and rights manager 24 is carried over a secure connection (SSL), the rights manager 24 may optionally encrypt the RO so that encrypted RO can be safely stored on the client device 10.

Figure 4:
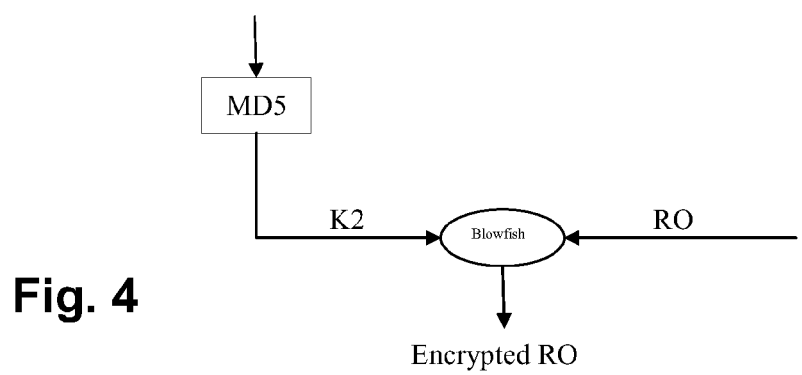
FIG. 4 is a diagram of the key wrapping, in accordance with an embodiment of the present invention.

The encryption of the RO is illustrated in FIG. 4. To encrypt the RO, the rights manager 24 uses the following symmetric encryption scheme. The RO is encrypted with 64-bit Blowfish key constructed from the checksum (domain key+device id+key nonce). To compute K2, the rights manager 24 applies an MD5 checksum function to the device-id.

Message Flow

Figure 5:
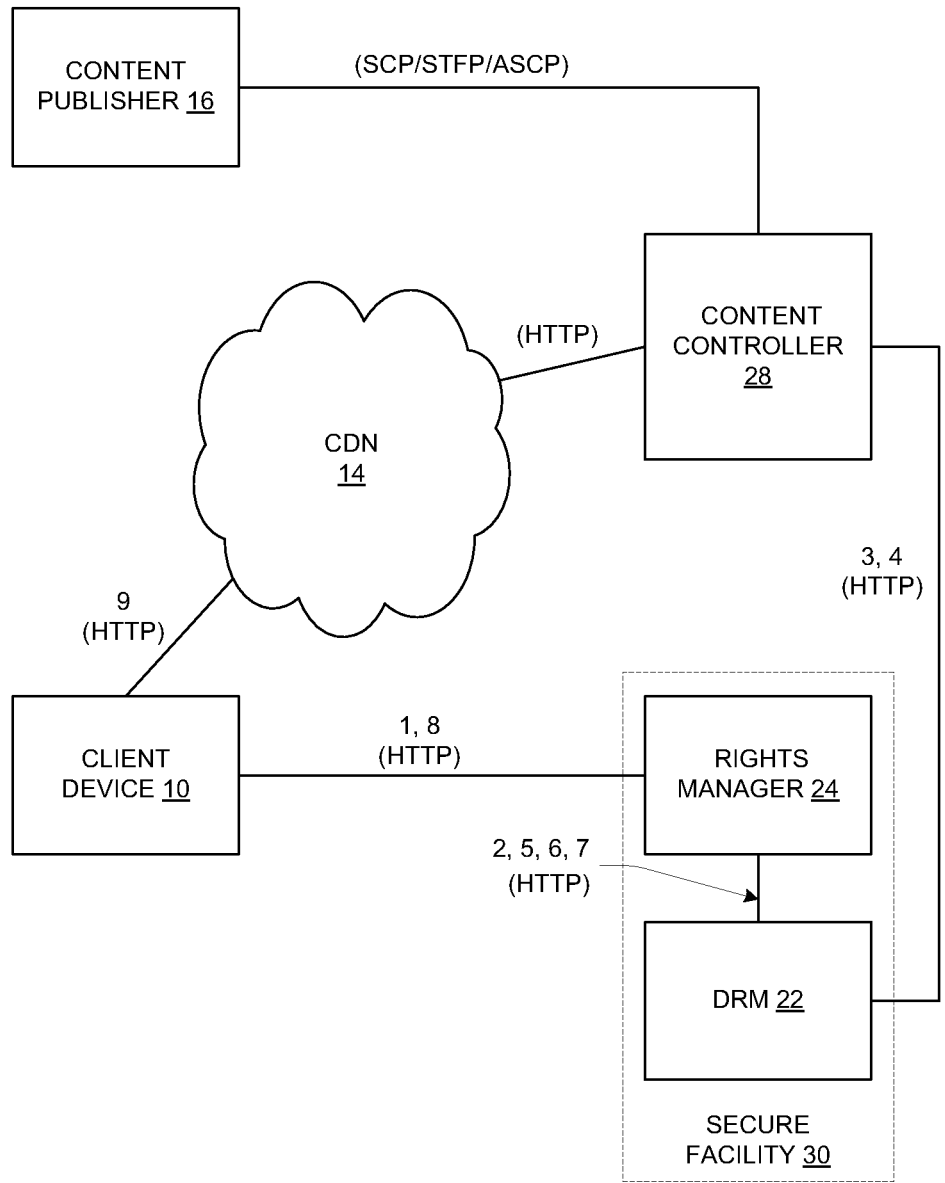
FIG. 5 is a block diagram of a system showing interfaces and message formats between system components.

FIG. 5 contains a block diagram showing interfaces (numbered reference points) between system components. The following is a description of messaging flows (including message formats) among the components.

The ingestion flow consists of secure transfer of content from the content publisher 16 via a secure transfer method such as scp, sftp, or ascp (Aspera) to the content controller back-end server 28, which in turn transcodes and encrypts the content using the chosen content cipher (e.g., AES or HC-128) and publishes it into the CDN 14.

The interfaces and associated protocols are described next for each of the numbered reference points in FIG. 5.

1. Over this HTTP interface, the client 10 performs a one-time device registration with the rights manager 24 (and DRM Server 22) passing the device-id, key nonce, and message nonce encrypted with the Blowfish algorithm using the domain key that is stored in an obfuscated manner in the application binary as described above. The registration information is passed through to the DRM Server 22 via the interface 2 described below. Depending on specific deployment requirements, the client may 10 may alternatively go to the DRM server 22 first, and the DRM server 22 then communicates with the rights manager 24.

Also, on the same interface, every time the client 10 needs to play a media, it sends media rights requests to the rights manager 24 also encrypted via Blowfish with a device-specific key. The media rights request contains device id, media id, logical id (a unique abstract user identifier) provided by the DRM server 24 when the device was registered, message nonce, and the current play count.

2. This HTTP interface is used as a pass-through interface, where the rights manager 24 relays requests (device registration and media location and rights requests) received from the client 10 and destined to the DRM server 22. These messages are encrypted as noted in #1. The rights manager 24 maintains user information which the DRM server 22 does not have access to, and the rights manager 24 maps individual users to logical ids maintained by the DRM server 22. The rights manager 24 appends the logical id, uniquely identifying the current user, to all requests being forwarded to the DRM server 22. The only exception is the initial device registration because it does not have a logical id for that user at that point. The logical ids need not be encrypted when these servers are in a secure facility 30 with restricted access as shown. In environments where these servers need to be remote, a secure connection would be needed between them. The secure connection may take the form of a virtual private network (VPN) or a Secure Sockets Layer (SSL) connection.

3. This HTTP interface is used by the DRM server 22 to request media information from the back-end content controller 28. This interface is used to obtain information needed to play a user-selected media item. The request by itself does not have any commercial value and is therefore not encrypted nor sent over a secure channel.

4. This HTTP interface carries the response of the content controller 26 to the DRM server request described under item #3 above. The response is an XML document, containing media URL pointing to an encrypted media file located in the CDN 14 and an encrypted message which contains information about the cipher and the key used to encrypt this media. The message is encrypted with the Blowfish algorithm and the domain key.

5. Via this HTTP interface the DRM server 22 asks the rights manager 24 for media rights for the current user. The request contains logical id, media id, and the play count reported by the client 10. This interface is used when the client 10 is requesting media rights as described in #1. The information need not be encrypted when the DRM server 22 and rights manager 24 are in a secure facility 30. Alternatively, a secure connection may be employed.

6. This HTTP interface carries the response of rights manager 24 to the DRM server request described under item #5 above. The response is an XML document containing rights information for the requested media and the current user. This interface is used only when the client 10 is requesting media rights. The response need not be encrypted when the DRM server 22 and rights manager 24 are in a secure facility 30. Alternatively, a secure connection may be employed.

7. This HTTP interface sends the response of the DRM server 22 to the rights manager 24. Two types of responses are sent over this interface: the device registration response and the media location and rights in response to requests described under item #2 above.

The device registration response is an XML document that contains an encrypted message (containing the logical id) destined for the client 10, and also the logical id and total device count for the current user in the clear. The rights manager 24 uses the device count to check against the total count of authorized devices for the user. It removes the logical id and device count from the response, before forwarding it to the client 10 on interface 8. The client completes the registration on its end when it can receive the encrypted message and successfully decrypt and verify the nonce and checksum in the message.

The media rights and location response is an XML document that contains the media URL pointing to an encrypted media file located in a CDN 14, and an encrypted message (destined for the client) which contains information about the cipher and the key needed to decrypt this media and media rights information for the current user. This response is forwarded to the client 10.

In both types of responses, the message is encrypted with a key produced from the domain key, device id, and the key nonce.

8. This is a pass-through interface where the rights manager 24 simply forwards the responses it received from the DRM server 22 to the client 10, in response to the client's requests described under item #1 above. The contents of these responses are described fully in #7.

9. This is the interface by which the content is delivered to the client 10 from the CDN 14.

Figure 6:
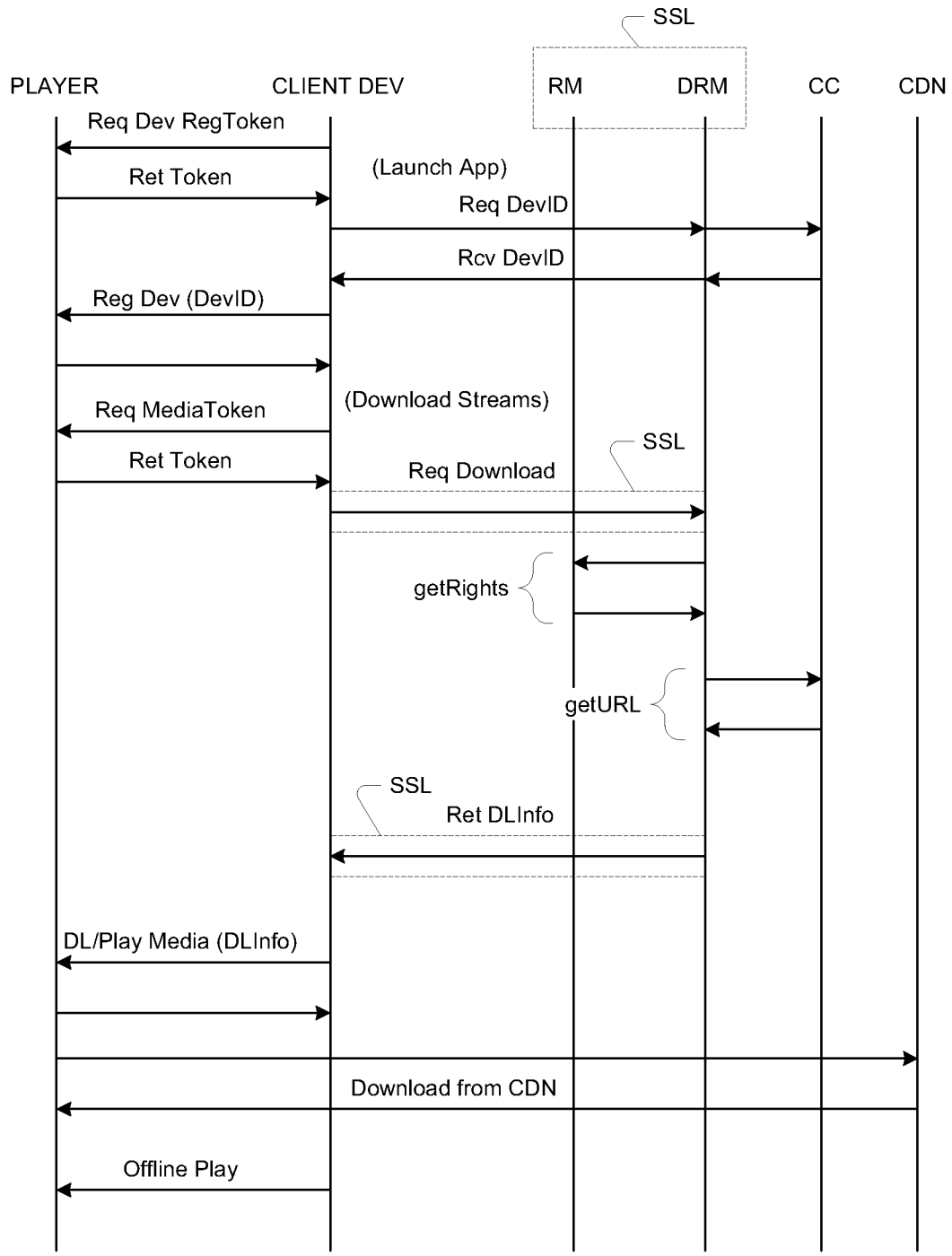
FIGS. 6-8 are diagrams of message flows during system operation in accordance with an embodiment of the present invention.
Figure 7:
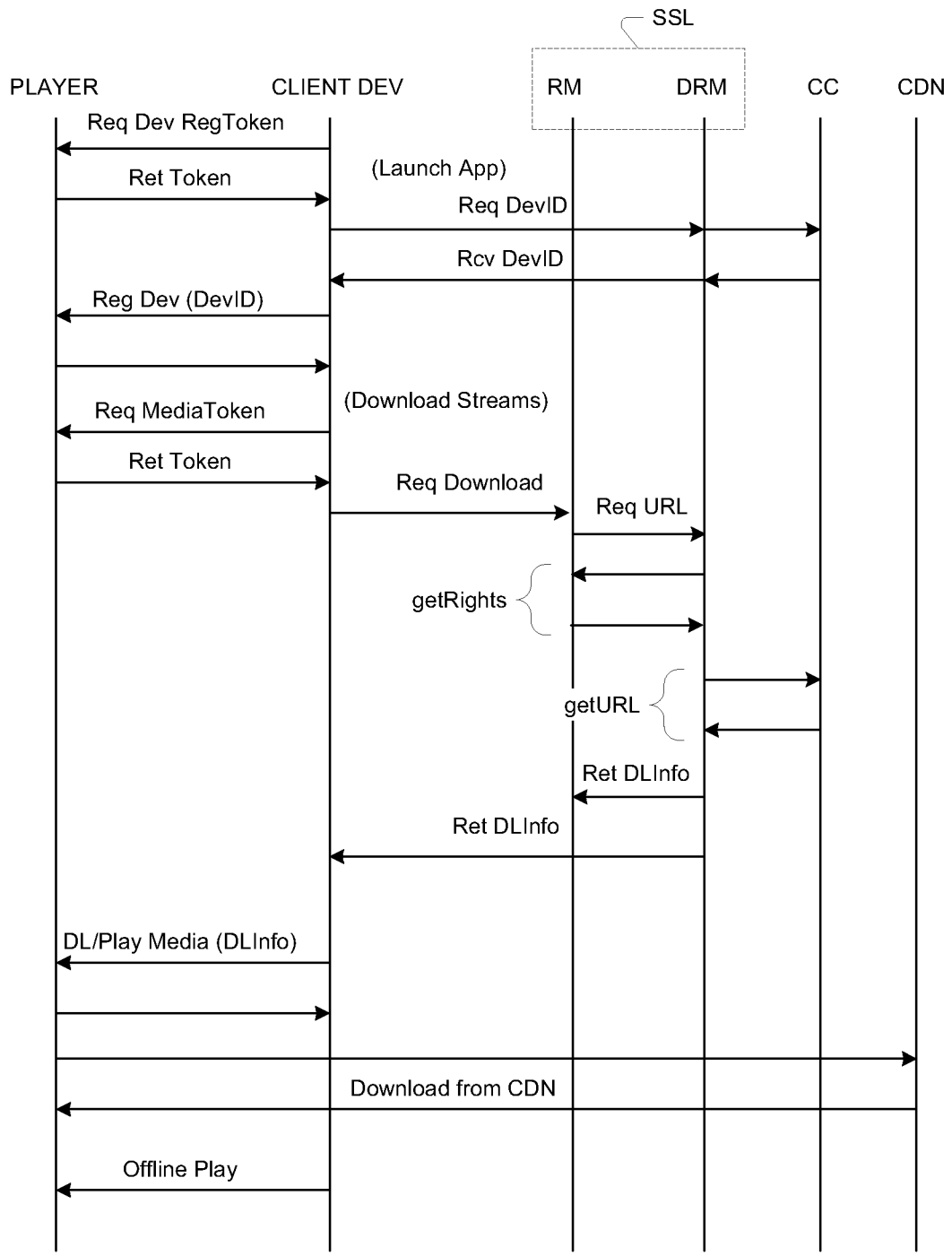

FIG. 6 is a message flow ladder-diagram for one embodiment of the present invention. It describes the message flow for device registration and obtaining the rights object containing the content key for playing the content. FIG. 7 contains another message flow ladder-diagram for an alternate embodiment where the client 10 is in direct communication with the intervening rights manager 24, which in turn communicates with DRM server 22.

Figure 8:
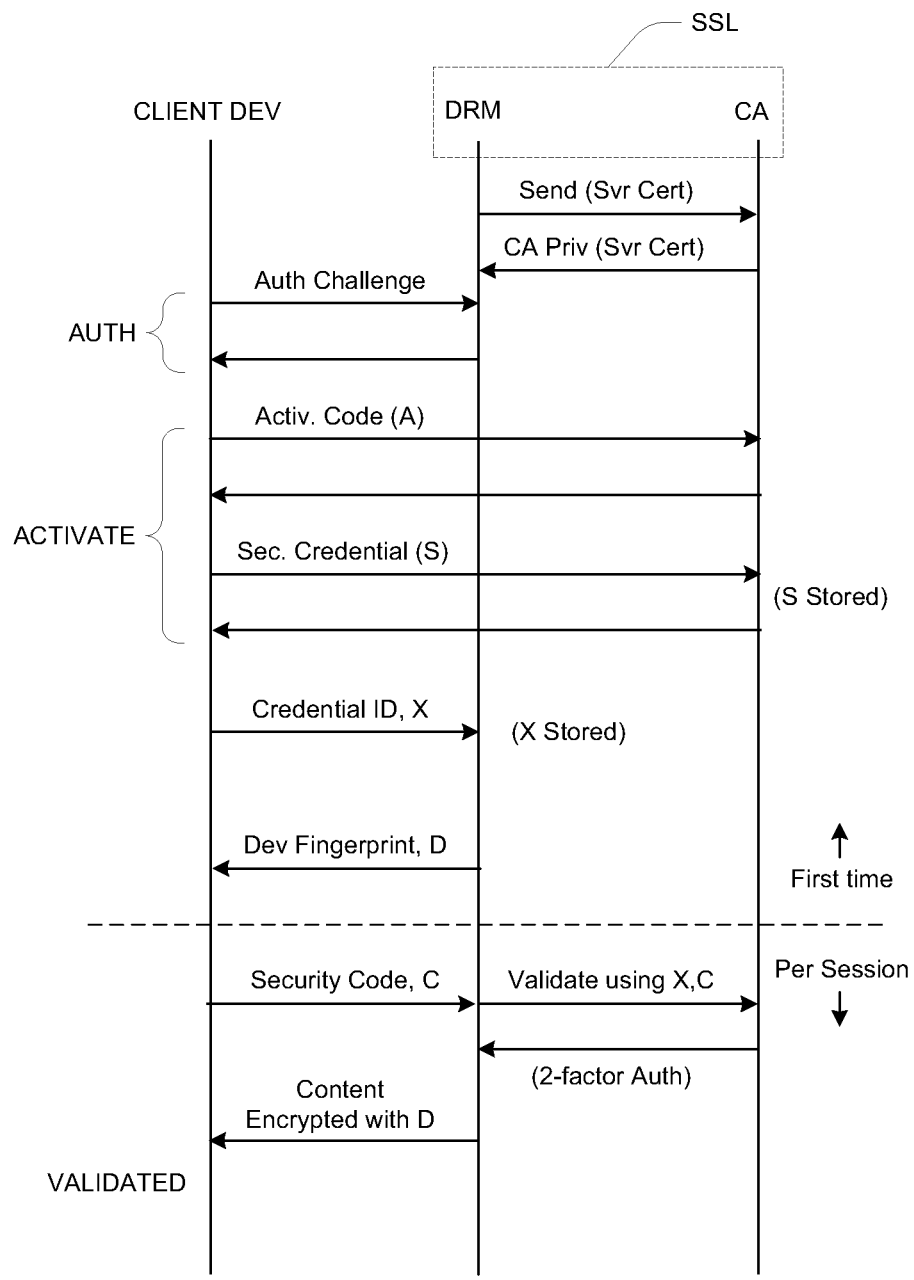

FIG. 8 illustrates a work flow for integrating functionality of a certificate authority (CA) into the content protection scheme. The work flow consists of the following steps:
 1. Have a server certificate signed by the CA
 2. Distribute the application to devices via application stores
 3. Initially, a client 10 authenticates with a server via SSL via the following:
  A. Authentication could be passed through to a customer authentication server 12
  B. The customer authentication server 12 receives an activation code from the CA and passes it to the client 10
  C. The client 10 uses the activation code (using tools of a software development kit (SDK) of the CA) to obtain an encrypted security credential from the CA, wherein the security credential=(the shared secret, a credential ID, and a creation time)
  D. The client 10 sends the credential ID to the server 12 which is linked to an authentication record
  E. The client 10 registers by sending the device fingerprint to the server 12 and gets a device-specific key
 4. For a session, a client 10 is validated as follows:
  A. The client uses the CA SDK to dynamically generate a security code from the security credential and sends it to the server 12 via SSL
  B. The server 12 contacts the CA to validate the client 10 using the stored credential ID together with the security code
  C. The server 12 returns the content key encrypted with the device-specific key
  D. In offline mode, the DRM agent of the client 10 will offer protection with an offline timeout that forces contact with server 12 (which includes protection against clock tampering as described below)

Anti-Clock Rollback Protection

Clock rollback is a technique employed to illegally extend time-based licenses. A user manipulates the clock on a playback device so that the time-based license expiration is reached later than it should (or not at all). To detect clock roll-back, time is sampled on the client device 10 when the application is registered and every time it starts up, and the time is stored into the encrypted file. When a player is instantiated to play a user-selected media item, a separate thread is also started to monitor the progression of time during playback. The thread sleeps for a short time period, wakes up, and increments an elapsed time counter. That elapsed time is added to the last known local time. Thus, the application always has information about what the time should be (to an approximation). This technique can be augmented to include time information from a server 12.

Rights File Integrity Protection

The rights file (also referred to as rights object herein) is stored on the client device 10 and contains the device-specific key and the content-keys encrypted with the device-specific key. The rights file itself is encrypted with the key constructed from the domain key and the unique identifier of the device. The contents of the file are checksummed and the checksum itself is stored within the file. When the file is decrypted, the contents are checksummed again and the computed checksum is compared with the checksum stored in the file to verify that the file has not been tempered with. The rights file also has a copy protection feature, in a sense that an outdated copy of the file cannot be written over the fresh copy without being detected by the DRM Agent. The copy protection is platform-dependent. On the iPhone/iPad platforms, DRM Agent obtains a unique property of the file and stores it within the encrypted file. The unique file value is not something that can be controlled at will, it is a property that is assigned by the operating system. Those skilled in the art may choose this file property such that copying the file would force a change in the unique value. On Android the rights file is stored within the application-specific directory which is protected from other applications and from user access via standard Linux permissions. Furthermore, DRM Agent generates a random long number and stores it within the encrypted file as well as within the application-specific directory on the device. The two numbers are compared when mobile application starts. On the Blackberry platform, a similar randomly generated long number is stored inside the encrypted file as well as within the application-specific persistent secure storage offered by the Blackberry platform.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Although the above description includes numerous specifics in the interest of a fully enabling teaching, it will be appreciated that the present invention can be realized in a variety of other manners and encompasses all implementations falling within the scope of the claims herein.

What is claimed is:

1. A method for secure over-the-top delivery of content to client devices, comprising:
    ingesting content in the form of media item files containing respective distinct user-selected media items, each user-selected media item being a media title specifically requested for playback by requesting users of respective client devices, the ingesting including receiving the media item files from a content publisher and performing media preparation for each media item file, including:
        (i) transcoding the user-selected media item contained in the media item file to a plurality of transcoded media items of respective distinct media encoding formats,
        (ii) segmenting each transcoded media item into a respective plurality of fixed-size segments for segment-based delivery of the transcoded media item to the client devices;
        (iii) obtaining a media-item-specific media encryption key for the specifically requested user-selected media item from a digital rights management server and encrypting each segment of each of the transcoded media items using the media encryption key and a respective encryption cipher for the specifically requested user-selected media item, the encrypting producing respective encrypted segments, and
        (iv) publishing a plurality of distinct transcoded media item files to a content delivery network from which the client devices retrieve the transcoded media item files, each transcoded media item file including the encrypted segments for the respective transcoded media item; and
    in response to respective requests for playback of a user-selected media item by the requesting users of the client devices, delivering respective client-device-specific rights objects to the client devices wherein a client-device-specific rights object is formed responsive to a device identifier, a media identifier of the user-selected media item and a user identifier of the requesting user, each rights object containing the media-item-specific media encryption key for the user-selected media item and an identification of the encryption cipher for the user-selected media item, each rights object being securely delivered to the respective requesting client device in a respective client-device-specific manner to be usable by only the respective requesting client device in decrypting a respective transcoded media item file retrieved from the content delivery network,
    and further wherein each requesting client device engages in a respective device registration process including sending device and user identification information encrypted with a respective secret domain key built-in to the client device and establishing a device-specific secure channel as well as a device-specific rights encryption key, the device-specific rights encryption key being shared with the client device and generated using the device information and the respective domain key, each requesting client device sending a media rights request that is encrypted with the respective domain key and generated relative to requesting playback of the user-selected media item.

2. The method according to claim 1, wherein the user-selected media items are respective distinct complete movies.

3. The method according to claim 1, wherein the encryption cipher is one of a plurality of distinct encryption ciphers, and wherein encrypting each segment of a user-selected media item includes identifying the one encryption cipher as distinct from others of the encryption ciphers for use in encrypting the segments of the respective user-selected media item.

4. The method according to claim 3, further including maintaining respective distinct media preparation profiles for the user-selected media items, the media preparation profiles including respective media-item-specific identifications of respective ones of the encryption ciphers to be used in encrypting the segments of the respective user-selected media items.

5. The method according to claim 4, wherein the encryption ciphers include one or more stream ciphers for which a key length is also per-media-item configurable, and wherein the media preparation profiles include respective distinct key length values for different key lengths to be used in the encrypting of the respective user-selected media items.

6. The method according to claim 1, wherein each rights object is securely delivered to the respective requesting client device by encrypting the rights object with a respective client-device-specific rights encryption key.

7. The method according to claim 1, wherein encrypting the segments includes performing an encryption operation using a key of a certain length combined with data of protected content, the encryption operation including:
    randomly generating the media encryption keys on a per-media-item basis at the time of the ingesting of the respective media item files;
    establishing distinct initialization vectors for the segments as respective sequence numbers of the segments; and
    performing an encryption algorithm on each segment using the respective initialization vector, the encryption algorithm including cipher block chaining within each segment and not spanning multiple segments.

8. The method according to claim 1, wherein the ingesting of the media item files includes receiving the media item files from the content publisher using a secure file transfer method.

9. The method according to claim 1, wherein the requests are media rights requests each including an identifier of a respective requesting client device, an identifier of a respective user-selected media item being requested, and a respective current play count maintained at the requesting client device for the user-selected media item being requested.

10. The method according to claim 1, wherein each delivered rights object is accompanied by a (i) pointer to a respective transcoded media file in the content delivery network, and (ii) an identifier of the encryption cipher used to encrypt the transcoded media file.

11. A computer system including one or more computers coupled together and executing respective computer program instructions causing the computers to co-operatively provide secure over-the-top delivery of content to client devices by:
ingesting content in the form of media item files containing respective distinct user-selected media items, each user-selected media item being a media title specifically requested for playback by requesting users of respective client devices, the ingesting including receiving the media item files from a content publisher and performing media preparation for each media item file, including:
  (i) transcoding the user-selected media item contained in the media item file to a plurality of transcoded media items of respective distinct media encoding formats,
  (ii) segmenting each transcoded media item into a respective plurality of fixed-size segments for segment-based delivery of the transcoded media item to the client devices;
  (iii) obtaining a media-item-specific media encryption key for the specifically requested user-selected media item from a digital rights management server and encrypting each segment of each of the transcoded media items using the media encryption key and a respective encryption cipher for the specifically requested user-selected media item, the encrypting producing respective encrypted segments, and
  (iv) publishing a plurality of distinct transcoded media item files to a content delivery network from which the client devices retrieve the transcoded media item files, each transcoded media item file including the encrypted segments for the respective transcoded media item; and
in response to respective requests for playback of a user-selected media item by the requesting users of the client devices, delivering respective client-device-specific rights objects to the client devices wherein a client-device-specific rights object is formed responsive to a device identifier, a media identifier of the user-selected media item and a user identifier of the requesting user, each rights object containing the media-item-specific media encryption key for the user-selected media item and an identification of the encryption cipher for the user-selected media item, each rights object being securely delivered to the respective requesting client device in a respective client-device-specific manner to be usable by only the respective requesting client device in decrypting a respective transcoded media item file retrieved from the content delivery network,
and further wherein each requesting client device engages in a respective device registration process including sending device and user identification information encrypted with a respective secret domain key built-in to the client device and establishing a device-specific secure channel as well as a device-specific rights encryption key, the device-specific rights encryption key being shared with the client device and generated using the device information and the respective domain key, each requesting client device sending a media rights request that is encrypted with the respective domain key and generated relative to requesting playback of the user-selected media item.

12. The computer system according to claim 11, wherein the user-selected media items are respective distinct complete movies.

13. The computer system according to claim 11, wherein the encryption cipher is one of a plurality of distinct encryption ciphers, and wherein encrypting each segment of a user-selected media item includes identifying the one encryption cipher as distinct from others of the encryption ciphers for use in encrypting the segments of the respective user-selected media item.

14. The computer system according to claim 13, wherein the secure delivery of content further includes maintaining respective distinct media preparation profiles for the user-selected media items, the media preparation profiles including respective media-item-specific identifications of respective ones of the encryption ciphers to be used in encrypting the segments of the respective user-selected media items.

15. The computer system according to claim 14, wherein the encryption ciphers include one or more stream ciphers for which a key length is also per-media-item configurable, and wherein the media preparation profiles include respective distinct key length values for different key lengths to be used in the encrypting of the respective user-selected media items.

16. The computer system according to claim 11, wherein each rights object is securely delivered to the respective requesting client device by encrypting the rights object with a respective client-device-specific rights encryption key.

17. The computer system according to claim 11, wherein encrypting the segments includes performing an encryption operation using a key of a certain length combined with data of protected content, the encryption operation including:
randomly generating the media encryption keys on a per-media-item basis at the time of the ingesting of the respective media item files;
establishing distinct initialization vectors for the segments as respective sequence numbers of the segments; and
performing an encryption algorithm on each segment using the respective initialization vector, the encryption algorithm including cipher block chaining within each segment and not spanning multiple segments.

18. The computer system according to claim 11, wherein the ingesting of the media item files includes receiving the media item files from the content publisher using a secure file transfer method.

19. The computer system according to claim 11, wherein the requests are media rights requests each including an identifier of a respective requesting client device, an identifier of a respective user-selected media item being requested, and a respective current play count maintained at the requesting client device for the user-selected media item being requested.

20. The computer system according to claim 11, wherein each delivered rights object is accompanied by a (i) pointer to a respective transcoded media file in the content delivery network, and (ii) an identifier of the encryption cipher used to encrypt the transcoded media file.

* * * * *